Nov. 23, 1948.　　　J. L. WHITE　　　2,454,728
CUTTING TOOL
Filed March 23, 1945
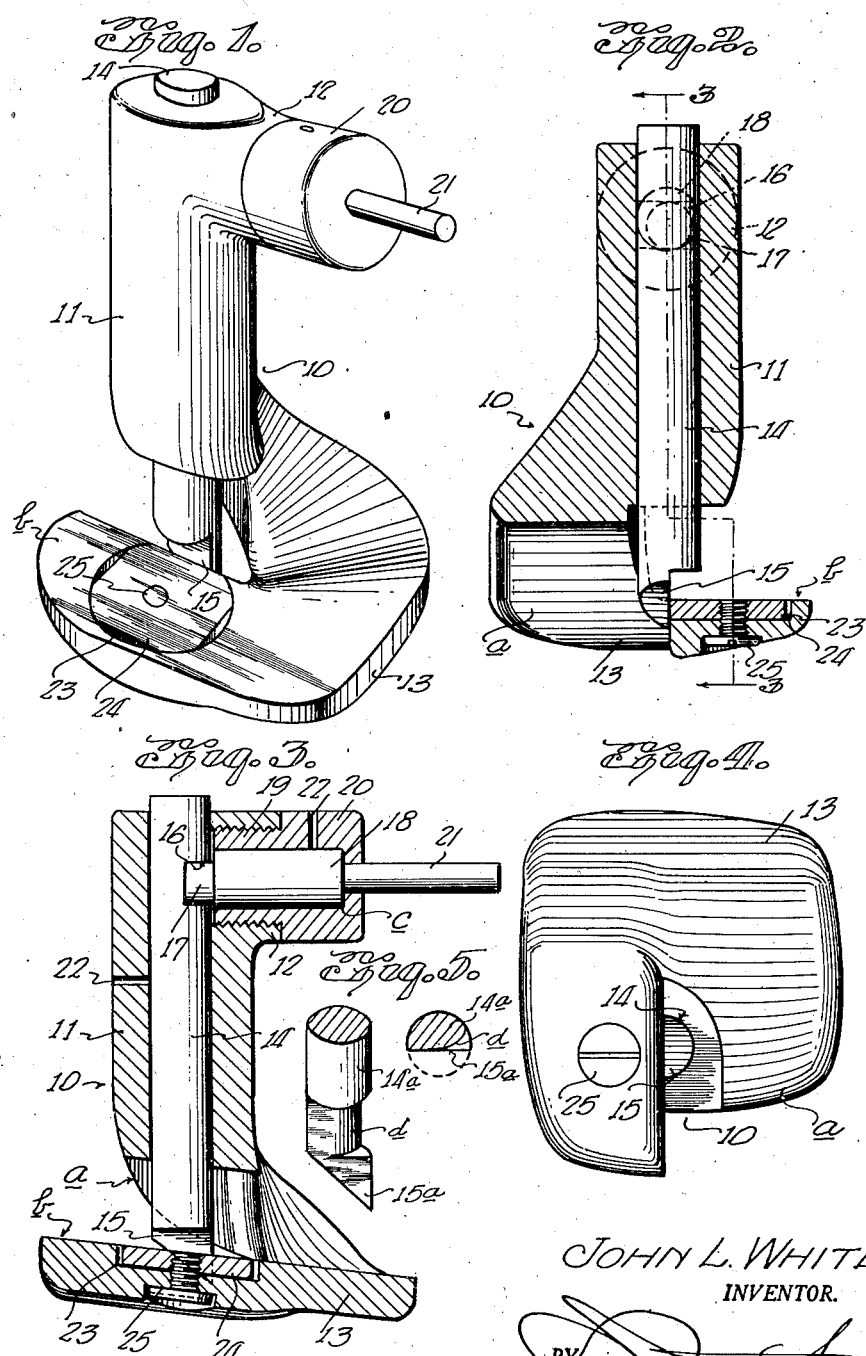
JOHN L. WHITE
INVENTOR.
ATTORNEY Patented Nov. 23, 1948

2,454,728

UNITED STATES PATENT OFFICE 2,454,728

CUTTING TOOL

John L. White, Dallas, Tex.

Application March 23, 1945, Serial No. 584,417

1 Claim. (Cl. 164—58)

This invention relates to tools for cutting sheet material and it has particular reference to a cutting tool especially adaptable for use with a portable power unit, designed to drive the tools of various detachable sub-units.

The principal object of the invention is to provide a cutting tool which is extremely simple in construction, having but two moving parts which are easily and quickly removed or replaced in the stock or shank for convenience of repair or replacement and further, the provision of a tool whose flexibility in adaptation, renders it useful under any and all conditions where a more expensive cutting tool is employed.

Another object of the invention is to provide a tool of the character set forth having an integral foot and a cutter shank and combining a novel form of reciprocating medium for the cutter mounted in the shank, the said medium consisting of a lateral driving shaft having an off-centered pin rotatably disposed in a transverse slot in the cutter plunger. Moreover, the curvilinear formation of the work engaging foot is such that the latter embraces the cutting area at a point spaced below the shank, to provide a supporting surface for the work being subjected to the action of the cutter; to guide the work as it is being cut away from the cutter and to adequately reinforce the tool about the cutting area.

Still another object of the invention is to provide a sheet material cutting tool in which the work supporting surface has embedded therein an adjustable shear plate, the adjustability of this plate enabling the latter to be rotated to new positions when the operative edge has become worn or nicked.

With the foregoing objects as paramount, the invention has further reference to certain features of accomplishment which will become apparent as the description proceeds, taken in connection with the accompanying drawings wherein:

Figure 1 is a perspective view of a tool constructed according to the present invention.

Figure 2 is an elevational view from the front of the tool, in vertical section.

Figure 3 is an elevational view rotated 90° from Figure 2 and in vertical section on line 3—3 on Figure 2.

Figure 4 is a bottom plan view of the tool, and

Figure 5 is a combined showing of a modified form of cutting plunger in fragmentary perspective and in transverse cross-section.

Continuing with a more detailed description of the drawing, reference numeral 10 denotes generally the body of the tool, made up of a shank 11, having a lateral boss 12 adjacent its upper end and a curvilinear foot or work engaging and supporting element 13 formed integrally and spirally on to its lower end.

The foot 13 originates at one side, near the lower end of the shank and curves downwardly and around the longitudinal axis of the shank and embraces the same except for a narrow passage in the front of the tool, in alignment with the plunger 14, through which work is introduced into the operative area of the cutter 15, formed on the lower end of the plunger. It will be observed that the foot 13 is slightly inclined in relation to the longitudinal axis of the shank 11 for convenience in manipulating the tool in relation to the work. At the juncture between the foot and the shank, the under surface *a* of the foot curves downwardly. This provision insures deflection of a severed portion of the material away from that part of the material supported upon the plano work supporting surface *b*.

The plunger 14 is reciprocably mounted in a bore extending axially through the shank 11 and adjacent its upper end, there is provided a transverse slot 16 into which extends a pin 17 carried by and offset in relation to the axial center of the drive shaft 18. It will be noted that the width of the slot 16 is such as to allow but slight clearance between its walls and the pin 17 but its length is greater than the diameter of this pin. Obviously, when the shaft 18 is rotated, the eccentric movement of the pin 17 constrains the plunger 14 to reciprocate and the degree of displacement thereof is equal to the degree of offset of the pin and this ratio may be varied in accordance with displacement requirements of the plunger.

The boss 12 of the shank 11 is interiorly threaded to receive the threaded nipple 19 of the collar 20. Both the nipple 19 and collar 20 are cored to receive the enlarged portion of the drive shaft identified by reference numeral 18 in Figure 3 but this core terminates short of the end of the collar 20, providing a shoulder *c* which takes the thrust of the said enlarged portion 18 of the drive shaft and limits longitudinal displacement of the drive shaft. The portion 18, the pin 17 and the spindle 21 are turned from a single piece of material and this piece as well as the plunger 14 is case hardened to minimize frictional wear.

It is intended that the spindle 21 be secured in and driven by the chuck of a conventional electric hand drill but it is apparent that any other form of drive may be applied to the spindle 21 and for that matter, the tool may be stationarily mounted so that the spindle 21 may be driven by a belt or flexible shaft as desired. Provision is made through the holes 22 in the shank 11 and collar 20 for lubricating the plunger 14 and shaft 18 respectively.

Referring again to the foot 13, this member has a recess 23 which communicates with the open area next adjacent the operative end of the plunger 14 or specifically the cutter 15. This recess may be of any desired shape but is preferably circular and receives a conformably shaped shear plate 24, held in place by screw 25 which enters the same through the foot 13 from the bottom. Through this provision, any impairment of the operative edge of the shear plate may be corrected by rotating the plate to a new position or by grinding a new edge on the plate. Moreover, by virtue of the plurality of shearing edges spaced about the plate 24, provision is made for cutting materials of various gauges, it being pointed out that the relative spacing between the cutter 15 and shearing edge of the plate may be varied by changing the position of the plate in the recess 23.

Should the cutter 15 become worn or damaged, it is a simple matter to back off the collar 20 to withdraw the pin 17 from the slot 16 in the plunger 14 and remove the latter from the shank. It may then be reground or replaced by a new cutter at small cost.

As a modification of the cutter plunger 14, a construction as shown in Figure 5 is provided. By grinding a radius d in the shank 14a immediately above the integrally formed cutter blade 15a, it is possible to move the tool in an arcuate course in cutting to the left as expeditiously as to the right, the said radius removing obstruction to the work, otherwise presented by the stock of the plunger directly above the shear blade.

Manifestly, the construction as shown and described is capable of some modification and such modification as may be construed to fall within the scope and meaning of the appended claim is also considered to be within the spirit and intent of the invention.

What is claimed is:

In a metal cutting tool, a reciprocable plunger therefor provided with a shear blade on one end and whose shank is ground to produce a work deflecting radius originating approximately in line with and above the center of the shear blade and extending in a gradual curve about the axis of said plunger to a terminus at approximately 45° from its points of origin.

JOHN L. WHITE.

REFERENCES CITED

The following references are of record in the file of this patent:

UNITED STATES PATENTS

| Number | Name | Date |
|---|---|---|
| 705,069 | Grall | July 22, 1902 |
| 1,342,240 | Walter | June 1, 1920 |
| 1,737,884 | Hexdall | Dec. 3, 1929 |
| 1,922,846 | Gray | Aug. 15, 1933 |
| 2,125,556 | Gleich | Aug. 2, 1938 |
| 2,226,241 | Gray | Dec. 24, 1940 |
| 2,256,779 | McHenry | Sept. 23, 1941 |
| 2,268,728 | Toop | Jan. 6, 1942 |